United States Patent [19]

Wang et al.

[11] Patent Number: 5,734,513

[45] Date of Patent: Mar. 31, 1998

[54] ELECTRONIC APPARATUS WITH A FOLDABLE DISPLAY

[75] Inventors: Chien-Jui Wang, Taipei; James Lee, Hsinchu; Lance M. Lan, Kangshan; Lin-Lin Chen, Taipei; Tai Yuan Wang, Kaoshiung Hsine; Chien-Ping Kung, Hsinchu; Junejei Huang, Hsinchu; Wei-Chung Chao, Hsinchu; Dao-Yang Huang, Taipei, all of Taiwan

[73] Assignee: Industrial Technology Research Institute, Hsinchu, Taiwan

[21] Appl. No.: 627,293

[22] Filed: Apr. 3, 1996

[51] Int. Cl.$^6$ .......................... G02B 3/08; G02B 27/22; G09G 3/00

[52] U.S. Cl. .................... 359/742; 359/472; 359/474; 345/32

[58] Field of Search ........................ 345/32; 348/818; 358/335; 359/474, 472, 477, 742

[56] References Cited

U.S. PATENT DOCUMENTS

| | | | |
|---|---|---|---|
| 871,974 | 11/1907 | Verbeck | 359/474 |
| 5,483,250 | 1/1996 | Herrick | 345/32 |

*Primary Examiner*—David C. Nelms
*Assistant Examiner*—Evelyn A. Lester
*Attorney, Agent, or Firm*—W. Wayne Liauh

[57] ABSTRACT

A foldable screen display for displaying screen images is disclosed which comprises: (a) at least two sub-displays; (b) a hinging member for pivotally connecting the sub-displays together on a side-by-side manner; (c) a magnifying optical element provided on top of each of the sub-displays, the magnifying optical element providing a magnifying power of between about 1.05 and about 1.3 so as to cause images displayed on the sub-displays to be perceived by a user as if they were from a single display; and (d) a membrane covering both of the sub-displays and the hinging member, the membrane being made of a transparent and resilient material. In a preferred embodiment, the magnifying optical element is a zone plate type magnifying optical element and is constructed to provide a magnifying power approximately equalling to one plus the ratio between the width of the hinging member and the width of sub-display. The foldable screen display provides the advantages of being able to reduce the size of the display without compromising user's desire for maximum viewing comfort; therefore, it is an excellent device for use in making personal digital assistants, electronic books, electronic Rolodex®, pen-based computers, portable TV, etc.

20 Claims, 5 Drawing Sheets

ELECTRONIC APPARATUS WITH A FOLDABLE DISPLAY

FIELD OF THE INVENTION

The present invention relates electronic apparatus with a foldable display. More specifically, the present invention relates to portable electronic apparatus, such as subnotebook personal computers, personal digital assistants (PDAs), or other related devices, whose display screen can be conveniently folded when not in use so as to substantially reduce the physical dimension thereof with little or no comprise of the user's viewing comfort. The present invention also relates to such foldable displays.

BACKGROUND OF THE INVENTION

In this highly information-explosion age wherein the success and competitiveness of a business concern are closely tied to the communication infrastructure by which information can be quickly transmitted among and effectively utilized by its employees. One of the key components of providing the communication infrastructure inevitably involves the development of portable communication devices, such as notebook or subnotebook personal computers or personal digital assistants, both of which can be equipped with an external or built-in modem so as to facilitate the communication need.

In designing portable communication devices, physical dimension is a very important concern. On the one hand, it is highly desirable to design a device as petite as possible, so as to enhance portability and convenience. On the other hand, for maximum viewing comfort, the users always want to have a large display screen. A display screen provides the necessary interface between the user and the machine. This is especially true for devices provided with pen-based input means, a large screen not only allows viewing comfort, it also improves correctness of input. Therefore, in designing portable communicating devices, we are faced with two diversely conflicting needs, one need is to design a device that is as small as possible, and the other need is to increase the size of the screen display. At the present time, there has not been a satisfactory solution that will serve these two conflicting needs. U.S. Pat. No. 5,049,862 (the '862 patent) discloses a keyless flat panel portable computer and computer-aided notebook, in which two screens are provided which can be folded against each other so as to increase the display area. However, in the folded screen display disclosed in the '862 patent, the two screens each provide a separated and distinct function and do not satisfy the need of providing an integrated screen (i.e., each the two screens of the '862 patent is provided to show a separate display area; whereas, the need is that the two screens can be seamlessly combined so that they can be used to show a single display area as if the viewer were viewing a single screen).

SUMMARY OF THE INVENTION

The primary object of the present invention is to develop a foldable display screen that can be used in electronic devices so as to allowing minimized physical dimension and maximize viewer's comfort. More specifically, the primary object of the present invention is to develop a foldable display screen for use in portable electronic devices, such as notebook or subnotebook personal computers, hand-held personal computers, personal digital assistants, etc., wherein it is desirable to reduce the physical size thereof while retaining a comfortably sized viewing screen. Alternately, the primary object of the present invention is to develop portable electronic devices such as notebook or subnotebook personal computers, hand-held personal computers, personal digital assistants, etc., which utilize these foldable screen displays. The foldable display disclosed in the present invention can also be used in a wide variety of other industrial electronic machines or devices, such as computer-assisted or computer controlled fabrication machines, measurement tools, etc. In these machines/devices, although minimized dimension may not be a primary concern, it is, however, desirable to be able to fold the screen display when not in use so as to provide maximum protection against inadvertent damage.

One of the key difference between the foldable screen display disclosed in the present invention and those disclosed in the prior art foldable devices is that, in the prior art devices, it is the device that is foldable, and the displaying screen itself is not foldable. On comparison, with the present invention, the displaying screen comprises at least two sub-displays, which can be folded onto each other so as to reduce the displaying screen itself when not in use. By being able to fold the display itself when not in use and unfold it during use, the physical dimension of the electronic device can be substantially reduced without compromising the viewing comfort desired by the users.

In a preferred embodiment of the foldable screen display disclosed in the present invention, two sub-displays are provided which are hinged together and can be pivoted from 0 (fully closed) to 180 (fully open) degrees angle with respect to each other about a central axis connecting these sub-displays. When the display is in a folded position, the two sub-displays are in 0 degrees from each other. When the display is opened for use, the two sub-displays are pivoting away from each other until they are positioned at about 180 degrees of each other. At that time, the pivoting movement will stop and the two sub-displays will be in a fixed and flat position relative to each other, so as to form an integral screen display.

When the two sub-displays are in a folded position, a safe distance is provided so as to avoid direct contact therebetween. Because the two displaying screens are placed inside their hard external surfaces, excellent protection is provided for the display in addition to the reduced physical dimension. When the two sub-displays are in a fully unfolded position, the displaying area is instantly doubled, thus allowing the user the maximum viewing comfort while providing excellent portability and spacial convenience. The two sub-displays can be connected vertically or horizontally. In a preferred embodiment, the two sub-displays are hinged together horizontally, one at the right and the other the left of the hinging means.

In order to provide the user with the feel of a true integral displaying screen instead of two separate screen, each sub-display is provided on the top thereof a magnifying optical element. The magnifying power of the optical element, which comprises a plano-convex optical lens, or a zone plate type plano-optical lens, is specially designed such that the two screens (from the sub-displays) can be seamlessly merged together as if the viewer were viewing at a single integrated screen. The provision of the specially designed magnifying optical element causes the images from the two adjacent screens to be shifted more closely together (i.e., towards each other); this allows the extraneous space caused by the existence of the hinging means to be removed.

The foldable display disclosed in the present invention further comprises a transparent membrane covering the two sub-displays and the hinge means therebetween. The transparent membrane can be made of a resilient and flexible material such as PVC, PE, etc. The arrangement of this resilient and flexible transparent membrane allows the two sub-displays to be truly integrated as a single display, which is foldable and does not allow the cumulation of dirt or other foreign substances.

The foldable display can be affixed with accessory electronic components in accordance to market demand and customer need so as to become a stand-alone device. These accessory components include key board, speakers, CCD camera, PCMCIA slots, etc. Furthermore, a pen-based pressure sensitive board can be provided on the surface of the display so as to form a complete electronic device.

In addition to the several applications described above, the foldable display can also be used a part of another electronic device, such as personal digital assistants, electronic books, electronic Rolodex®, pen-based computer, portable TV, etc. In summary, the foldable display disclosed in the present invention is an excellent addition to the already available 3C products (computers, communications, and consumer goods); it also provides an excellent and well-protected display means for other electronic devices such as digital controlled fabrication machines and measurement devices, etc.

BRIEF DESCRIPTION OF THE DRAWING

The present invention will be described in detail with reference to the drawings showing the preferred embodiment of the present invention, wherein:

FIG. 9 is a more detailed cross-sectional view along line 6-6" of the preferred embodiment of the foldable display of the present invention as shown in FIG. 5, when the two sub-displays are fully opened; FIG. 9 shows the various layers in order of distance from the sub-display: a plano-optical lens, a pressure-sensitive plate, and a resilient and flexible membrane.

DETAILED DESCRIPTION OF THE PREFERRED EMBODIMENT

The present invention discloses a foldable display screen for use in electronic devices so as to reduce the physical dimension without compromising the user's viewing comfort. One of the key difference between the foldable screen display disclosed in the present invention and those disclosed in the prior art foldable devices is that, in the prior art devices, it is the device that is foldable, and the displaying screen itself is not foldable. In comparison, with the present invention, the displaying screen comprises at least two sub-displays, which can be folded onto each other so as to reduce the displaying screen itself when not in use. By being able to fold the display itself when not in use and unfold it during use, the physical dimension of the electronic device can be substantially reduced without compromising the viewing comfort desired by the users.

In a preferred embodiment of the foldable screen display disclosed in the present invention, the foldable display comprises two sub-displays that are hinged together by a hinging means. The two sub-displays and can be pivoted from 0 (fully closed) to 180 (fully open) degrees angle with respect to each other about the hinging means connecting the two sub-displays. When the display is in a folded position, the two sub-displays are in 0 degrees from each other. When the display is opened for use, the two sub-displays are pivoting away from each other until they are positioned at about 180 degrees of each other. At that time, the pivoting movement will stop and the two sub-displays will be in a fixed and flat position relative to each other, so as to form an integral screen display. When the two sub-displays are in a closed position, a safe distance is provided so as to avoid direct contact therebetween. The hard external surfaces of the sub-displays provide excellent protection for the display in addition to the reduced physical dimension. When the two sub-displays are in a fully open, or unfolded, position, the displaying area is instantly doubled, thus allowing the user the maximum viewing comfort while providing excellent portability and spacial convenience. The two sub-displays can be connected vertically or horizontally. In a preferred embodiment, the two sub-displays are hinged together horizontally, one at the right and the other the left of the hinging means.

Each sub-display is provided on the top thereof a magnifying optical element so as to provide the user with the feel of a true single displaying screen instead of two separate screens. The magnifying power of the optical element, which comprises a plano-convex optical lens, or a zone plate type plano-optical lens, is specially designed such that the two screens (from the sub-displays) can be seamlessly merged together as if the viewer were viewing at a single screen. The provision of the specially designed magnifying optical element causes the images from the two adjacent screens to be shifted towards each other, thus causing the extraneous space caused by the existence of the hinging means to disappear.

The foldable display disclosed in the present invention further comprises a transparent membrane covering the two sub-displays and the hinge means therebetween. The transparent membrane can be made of a resilient and flexible material such as PVC, PE, etc. In the course of development of the foldable display disclosed in the present invention, it was discovered that, no matter how closely the two sub-displays were hinged together, a thin trench or channel will also exist between these sub-displays. After extended use, dirt can accumulate in this thin trench. This often caused great nuisance when using the foldable display. The arrangement of this resilient and flexible transparent membrane allows the two sub-displays to be truly integrated as a single display, which is foldable and does not allow the accumulation of dirt or other foreign substances. Furthermore, a pressure sensitive board can be provided on the surface of the display which forms a pen-based input device.

The foldable display can be used either as a main component with accessory electronic components affixed thereto, or as an accessory affixed to other electronic devices. The large number of applications that can be obtained from the foldable display disclosed in the present invention include personal digital assistants, electronic books, electronic Rolodex®, pen-based computer, portable TV, etc. as well as digital controlled fabrication machines and measurement devices, etc. In summary, the many advantageous features offered by the present invention, including the reduced physical dimension, increased viewing area and improved protection, allow the foldable display of the present invention to become an excellent display means for use in portable as well as in other industrial electronic devices.

Figure 1:
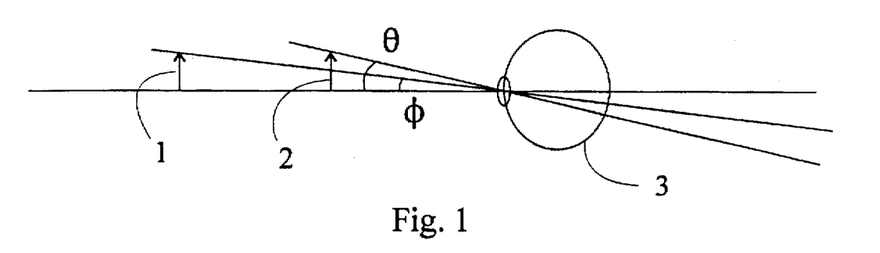
FIG. 1 is a schematic drawing illustrating how the size of an object is perceived by the naked eyes as a function of the distance of the object.

FIG. 1 is a schematic drawing illustrating how the size of an object is perceived by the naked eyes as a function of the distance of the object. In FIG. 1, although object 1 and object 2 are of the same size, because object 1 is farther away from the eye 3 than is object 2, the viewing angle $\phi$ is smaller than the viewing angle $\theta$. Thus object 1 is perceived as smaller than object 2.

Figure 2:
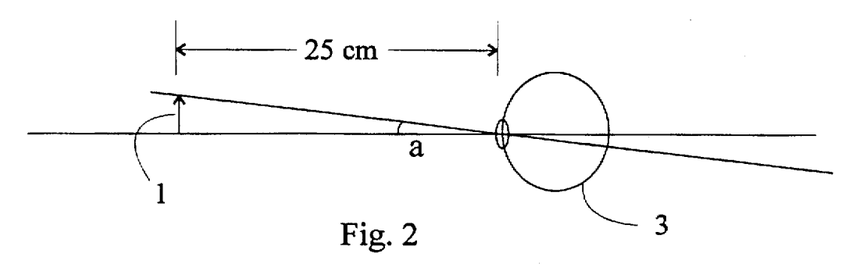
FIG. 2 is a schematic drawing illustrating how the size of an object is perceived by the naked eyes when the viewing distance is about 25 cm.
Figure 3:
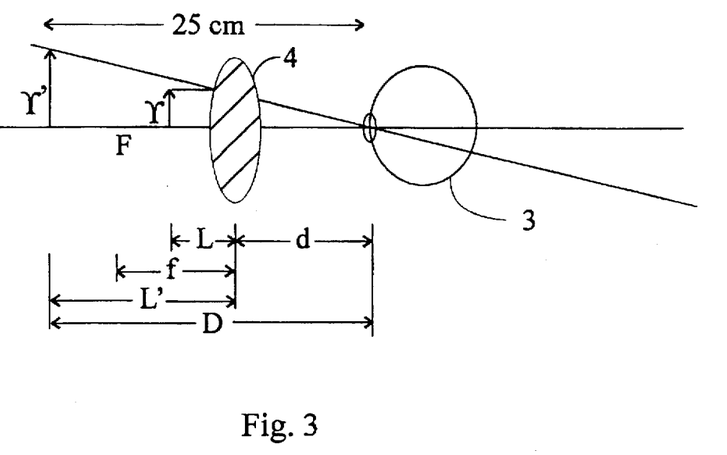
FIG. 3 is a schematic drawing illustrating how the size of an object, as perceived by the naked eyes, is affected by a convex optical lens.

FIG. 2 is a schematic drawing illustrating how the size of an object 1 is perceived by the naked eye 3 when the viewing distance is about 25 cm. The distance 25 cm is considered the normal distance for the eye 3 to obtain a clear picture. FIG. 3 is a schematic drawing illustrating how the size of an object 1, as perceived by the naked eyes 3, is affected by the use of a convex optical lens 4. The magnifying power, M.P., of an optical lens 4 is defined as follows:

$$M.P. = \frac{a}{a_0} = \frac{Y/D}{Y/25} = \frac{Y'}{Y} \cdot \frac{25}{D} \quad (a)$$

where M.P. is the magnifying of the optical lens; $a_0$ is the viewing angle of the image; a is the viewing angle of the object; Y' is the height of the image; Y is the height of the object; and D is the distance between the image and the eye.

Since the horizontal magnifying power, which is defined as m, equals L'/L, the above formula can be rewritten as:

$$M.P. = \frac{L'}{L} \cdot \frac{25}{D} = \left(1 - \frac{L'}{f}\right) \frac{25}{D} \quad (b)$$

where L is the distance between the object and the center of the lens 4; f is the focal length of the lens and L' is the distance between the image and the center of the lens 4.

Furthermore, since L'=−(D−D'); wherein D' is the distance from the lens to the eye therefore, $$M.P. = \frac{25}{D}\left[1 + \frac{1}{f}(D - D')\right] \quad (c)$$

where P is the refractive index of the optical lens 4.

Figure 4:
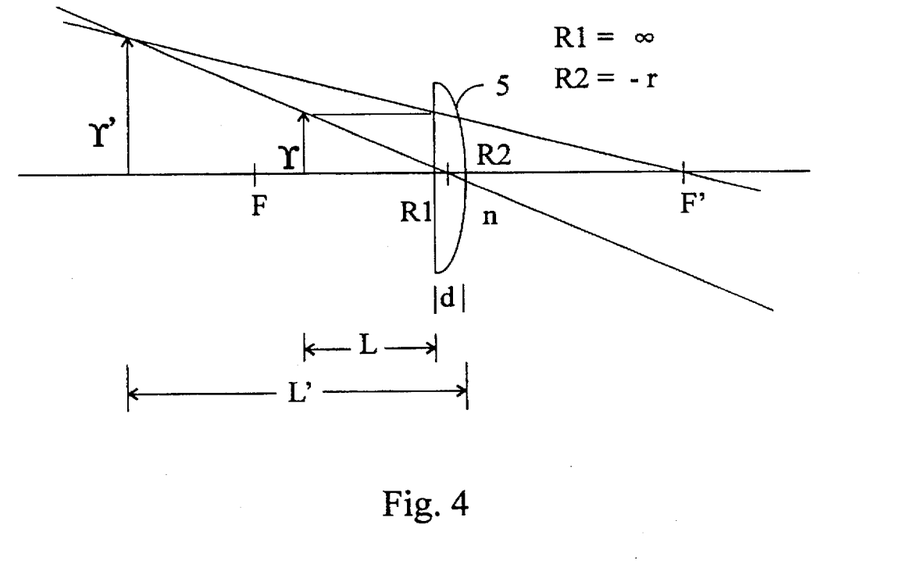
FIG. 4 is a schematic drawing illustrating the magnification of a plano-convex lens through the formation of a virtual image.

FIG. 4 is a schematic drawing illustrating the magnification of a plano-convex lens 5 through the formation of a virtual image. The plano-convex lens 5 as shown in FIG. 4 has a focal length f, a thickness (at its center) d, a radius r, and a refractive index n. In FIG. 4, the focal length f can be calculated as follows:

$$\frac{1}{f} = \frac{n-1}{r} \quad (d)$$

If the object is tightly adjacent to the flat surface of the plano-convex lens 5, the size of the virtual image can be calculated by the following simplified formula:

$$\frac{1}{L'} + \frac{1}{L} = \frac{1}{f} \quad (e)$$

$$m = \frac{S'}{S} = \frac{Y'}{Y} \quad (f)$$

schematic side view where S and S' are the distances from the image and the object, respectively, to the plano-convex lens. In a plano-convex lens, the radius of the plano part is infinite, and the radius for the convex part ($R_2$) is −r.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

A plano-convex optical lens was provided which had a refractive index n=1.5, center thickness d=2 cm, and the radius of the convex portion $R_2$=−10 cm. The major positions H' (for image) and H (for object) can be calculated by the following formulas:

$$LH' = \frac{fd(n-1)}{nR_1}, LH = \frac{fd(n-1)}{nR_2} \quad (g)$$

where LH' and LH are, respectively, the distances from H' and H to the respective top points of the plano-convex surfaces. Using a simplified formula, the above formulas can be reduced to the expressions that LH=d/n=4/3, and LH'=0 (because $R_1 = \infty$)

Using a formula that had been described previously, the focal length of the plano-convex optical lens can be calculated as follows:

$$\frac{1}{f} = \frac{n-1}{r} = \frac{1.5-1}{10} = \frac{1}{20} \quad (h)$$

Therefore, the focal length was calculated to be 20 cm. In the foldable display disclosed in the present invention, the object can be considered as being closely adjacent to the flat side (r=∞). Thus S=LH=d/n. Therefore, S' can be calculated as follows:

$$\frac{1}{S'} + \frac{1}{4/3} = \frac{1}{20} \quad (i)$$

Thus, S'=−10/7
The magnifying power m=S'/S=(10/7)/(4/3)=30/28≈1.07

EXAMPLE 2

Figure 5:
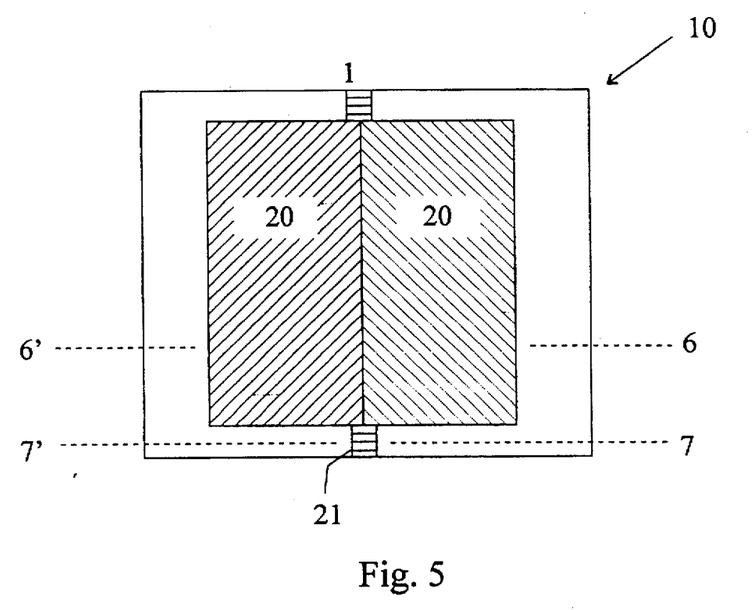
FIG. 5 is a top view of a preferred embodiment of the foldable display of the present invention when the two sub-displays are fully opened.
Figure 6:
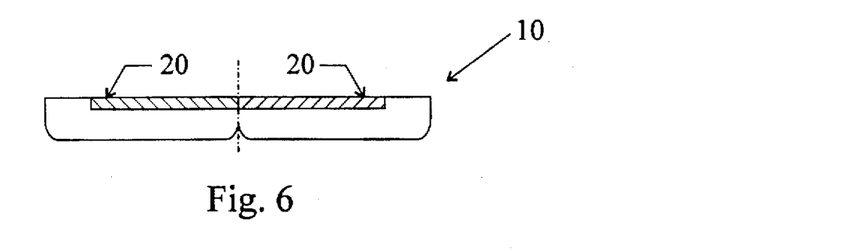
FIG. 6 is a cross-sectional view along line 6-6" of the preferred embodiment of the foldable display of the present invention as shown in FIG. 5, when the two sub-displays are fully opened.
Figure 7:
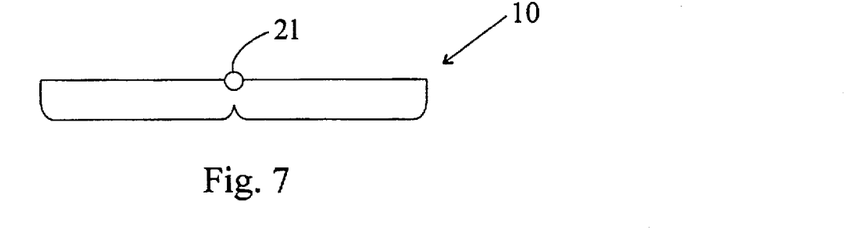
FIG. 7 is a cross-sectional view along line 7-7" of the preferred embodiment of the foldable display of the present invention as shown in FIG. 5, when the two sub-displays are fully opened.
Figure 8:
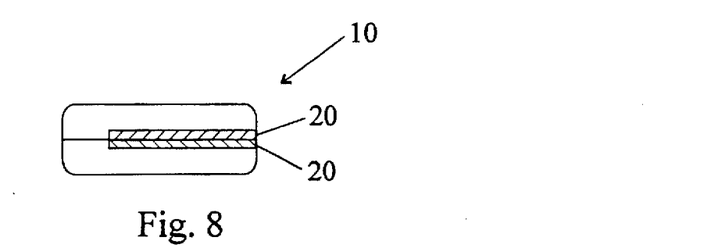
FIG. 8 is a side view of the preferred embodiment of the foldable display of the present invention as shown in FIG. 5, when the two sub-displays are folded together.
Figure 9:
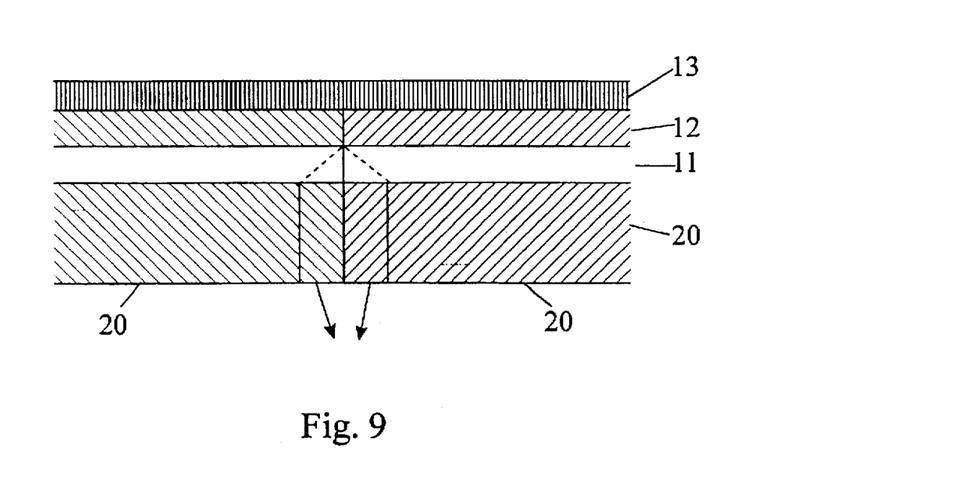

A foldable display 10 of the present invention comprising two sub-displays 20 hinged together by a hinging means 21 was constructed as shown in FIG. 5, which is a top view thereof with the two sub-displays 20 being fully opened. FIG. 6 is a cross-sectional view along line 6-6' and FIG. 7 is a cross-sectional view along line 7-7', both are of FIG. 5. FIG. 8 is a side view of the preferred embodiment of the foldable display of the present invention as shown in FIG. 5, when the two sub-displays 20 are folded together. And FIG. 9 is the same cross-sectional view as shown in FIG. 6 except that it provides more detailed information about the various components; FIG. 9 shows the various layers in order of distance from the sub-display 20: a zone plate type plano-optical lens 11, a pressure sensitive plate 12, and a resilient and flexible membrane 13.

Figure 10:
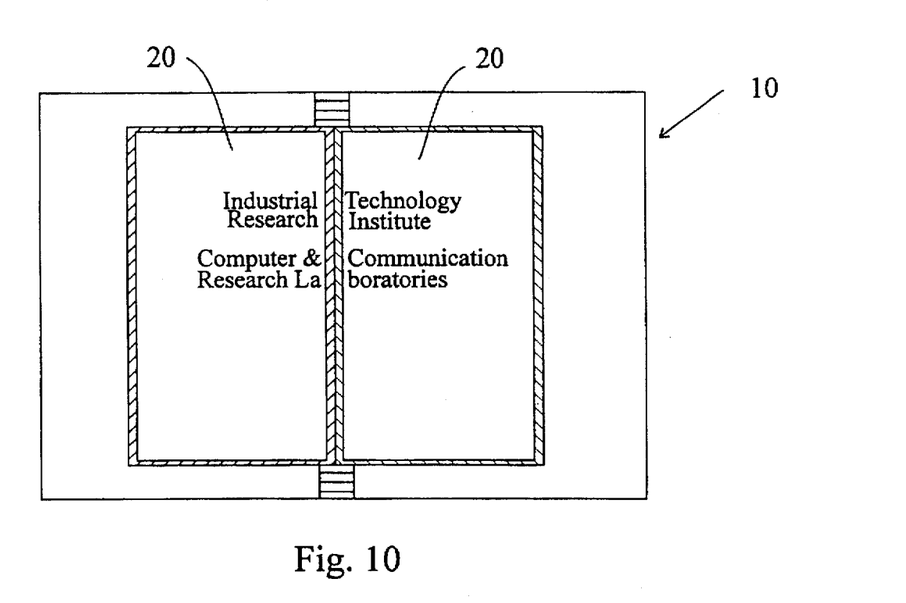
FIG. 10 is an illustrative schematic drawing of a foldable display of the present invention during actual use without a magnifying plano-optical element.
Figure 11:
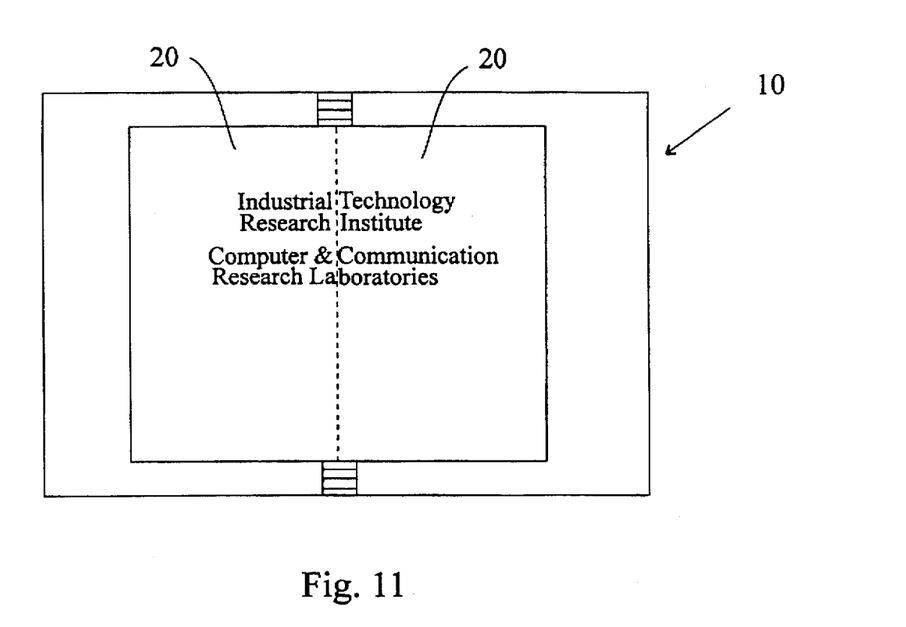
FIG. 11 is an illustrative schematic drawing of a foldable display of the present invention during actual use with a magnifying plano-optical element.

In FIGS. 5–9, a zone plate type plano-optical lens was used to provide the designed magnifying function. The zone plate used in the present invention was a plate in which alternate transparent and opaque rings obstruct every Fresnel half-period zone, such that light traveling through the plate formed an intense point image similar to that obtained from the plano-convex lens described in Example 1. FIG. 10 is an illustrative schematic drawing of a foldable display of the present invention during actual use without a magnifying plano-optical element. FIG. 11 is an illustrative schematic drawing of a foldable display of the present invention during actual use with a magnifying plano-optical element. In FIGS. 10 and 11, the two sub-displays were horizontally hinged together. Without the magnifying element, the display showed the character of a distinct two-display screen, with a conspicuously thick center blank line shown on the screen which was caused by the hinging means. On comparison, with the magnifying element, the center line disappeared, and the two sub-displays exhibited the character as a single display.

Figure 12A:
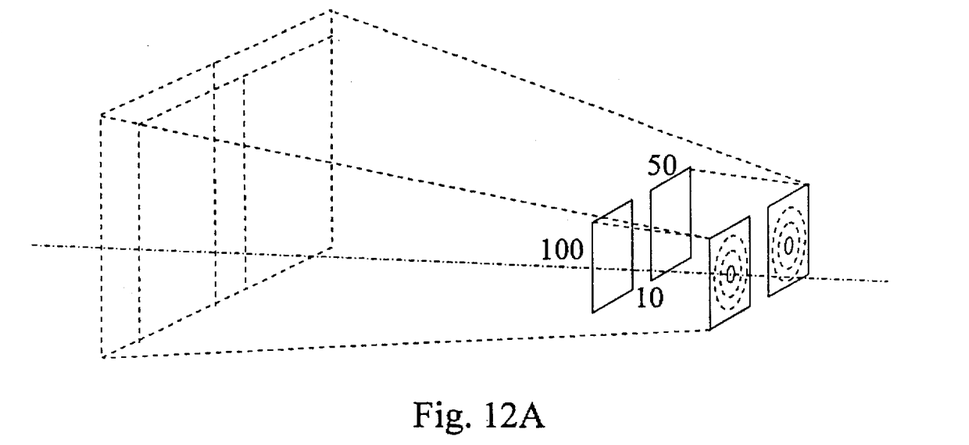
FIG. 12A is a schematic perspective drawing showing the principle of the foldable display of the present invention with a magnifying plano-optical element.
Figure 12B:
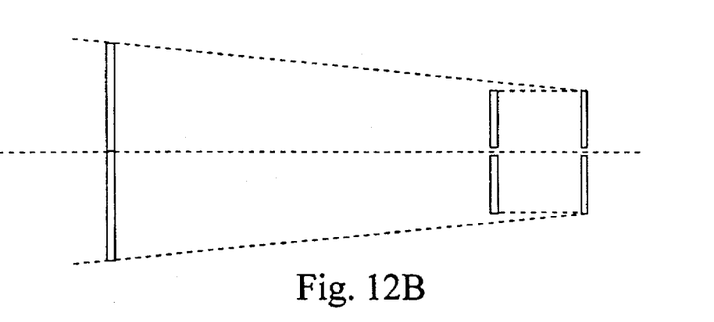
FIG. 12B is a schematic side view of FIG. 12A showing the principle of the foldable display of the present invention with a magnifying plano-optical element.
Figure 13:
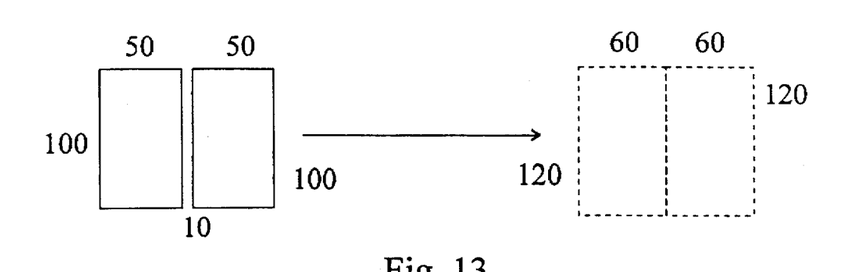
FIG. 13 is a schematic drawing showing the merging of the two screens thus the elimination of the hinge portion obtained using the foldable display of the present invention with a magnifying plano-optical element.

FIGS. 12A are a schematic perspective drawing and a schematic side view, respectively, showing the principle of screen merging utilized in the foldable display of the present invention with a magnifying plano-optical element. FIG. 13 is a schematic drawing showing the merging of the two screens thus the elimination of the hinge portion obtained using the foldable display of the present invention with a magnifying plano-optical element. In FIGS. 12A, 12B and 13, the display contained a magnifying zone plate with a equivalent focal length of 66 cm. Using Eq. (c) and with D=30 cm; it was calculated that the magnifying power was 1.2. Each of the two sub-displays used in the foldable display shown in FIG. 13 had a length of 100 mm and a width of 50 mm. The sub-displays were separated by a distance of 10 mm. After being magnified by a factor of 1.2 times, the screens of the two sub-displays merged together to form a single screen.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A foldable screen display for displaying screen images comprising:

(a) at least two sub-displays;

(b) a hinging means for pivotally connecting said sub-displays together in a side-by-side manner;

(c) a magnifying optical element provided on top of each of said sub-displays, said magnifying optical element providing a magnifying power of between about 1.05 and 1.3 so as to cause images displayed on said sub-displays to be perceived by a user as if they were from a single display; and (d) a membrane covering both of said sub-displays and said hinging means, said membrane being made of a transparent and resilient material.

2. A foldable screen display for displaying screen images according to claim 1 wherein said magnifying optical element is a plano-convex lens.

3. A foldable screen display for displaying screen images according to claim 1 wherein said magnifying optical element is a zone plate.

4. A foldable screen display for displaying screen images according to claim 1 wherein said sub-displays are connected horizontally.

5. A foldable screen display for displaying screen images according to claim 1 wherein said sub-displays are connected vertically.

6. A foldable screen display for displaying screen images according to claim 1 wherein said transparent membrane is made of polyethylene.

7. A foldable screen display for displaying screen images according to claim 1 wherein said transparent membrane is made of polyvinyl chloride.

8. A portable electronic device containing a foldable screen display, said foldable screen display comprising:

(a) at least two sub-displays;

(b) a hinging means for pivotally connecting said sub-displays together in a side-by-side manner;

(c) a magnifying optical element provided on top of each of said sub-displays, said magnifying optical element providing a magnifying power of between about 1.05 and 1.3 so as to cause images displayed on said sub-displays to be perceived by a user as if they were from a single display; and (d) a membrane covering both of said sub-displays and said hinging means, said membrane being made of a transparent and resilient material.

9. A portable electronic device according to claim 8 wherein said magnifying optical element is a plano-convex lens.

10. A portable electronic device according to claim 8 wherein said magnifying optical element is a zone plate.

11. A portable electronic device according to claim 8 wherein said sub-displays are connected horizontally.

12. A portable electronic device according to claim 8 wherein said sub-displays are connected vertically.

13. A portable electronic device according to claim 8 wherein said transparent membrane is made of polyethylene.

14. A portable electronic device according to claim 8 wherein said transparent membrane is made of polyvinyl chloride.

15. A portable electronic device according to claim 8 wherein said foldable display further comprises a pen-based pressure sensitive board disposed between said magnifying optical element and said membrane.

16. A portable electronic device according to claim 8 wherein said portable electronic device is a pen-based personal digital assistant.

17. A portable electronic device according to claim 8 wherein said portable electronic device is a subnotebook personal computer.

18. A computer-assisted manufacturing or measuring device containing a foldable screen display, said foldable screen display comprising:

(a) at least two sub-displays;

(b) a hinging means for pivotally connecting said sub-displays together on a side-by-side manner;

(c) a magnifying optical element provided on top of each of said sub-displays, said magnifying optical element providing a magnifying power of between about 1.05 and 1.3 so as to cause images displayed on said sub-displays to be perceived by a user as if they were from a single display; and (d) a membrane coveting both of said sub-displays and said hinging means, said membrane being made of a transparent and resilient material.

19. A foldable screen display for displaying screen images comprising:

(a) at least two sub-displays;

(b) a hinging means for pivotally connecting said sub-displays together in a side-by-side manner;

(c) a magnifying optical element provided on top of each of said sub-displays, wherein said magnifying optical element is constructed to provide a magnifying power approximately equaling to one plus the ratio between the width of said hinging means and the width of said sub-display; and (d) a membrane covering both of said sub-displays and said hinging means, said membrane being made of a transparent and resilient material.

20. A portable electronic device containing a foldable screen display, said foldable screen display comprising:

(a) at least two sub-displays;

(b) a hinging means for pivotally connecting said sub-displays together in a side-by-side manner;

(c) a magnifying optical element provided on top of each of said sub-displays, wherein said magnifying optical element is constructed to provide a magnifying power approximately equaling to one plus the ratio between the width of said hinging means and the width of said sub-display; and (d) a membrane covering both of said sub-displays and said hinging means, said membrane being made of a transparent and resilient material.

* * * * *